United States Patent
Fernandez

(10) Patent No.: US 7,019,616 B2
(45) Date of Patent: Mar. 28, 2006

(54) WIRELESS MESSAGE SYSTEM WITH MONITOR FEEDBACK AND AUTOMATIC BACKUP CONTROL

(76) Inventor: Jorge D. Fernandez, 200 Riviera Drive, Markham, Ontario (CA) L3R 5M1

(*) Notice: Subject to any disclaimer, the term of this patent is extended or adjusted under 35 U.S.C. 154(b) by 198 days.

(21) Appl. No.: 10/624,386

(22) Filed: Jul. 22, 2003

(65) Prior Publication Data

US 2005/0017843 A1    Jan. 27, 2005

(51) Int. Cl.
*H04Q 7/00* (2006.01)

(52) U.S. Cl. .................. 340/7.3; 340/7.44; 340/825.44

(58) Field of Classification Search ............... 340/7.28, 340/7.46, 7.51, 7.58, 7.24, 7.4, 7.44, 825.44, 340/825.16; 455/515, 67.11, 69, 70, 92, 455/115.1

See application file for complete search history.

(56) References Cited

U.S. PATENT DOCUMENTS 5,121,115 A * 6/1992 Andros et al. ......... 340/825.02
5,313,197 A * 5/1994 Barr et al. .................. 340/7.58

* cited by examiner

*Primary Examiner*—Michael Horabik
*Assistant Examiner*—Matsuichiro Shimizu
(74) *Attorney, Agent, or Firm*—Tarolli, Sundheim, Covell & Tummino L.L.P.

(57) ABSTRACT

A messaging system for determining whether a wireless message has been transmitted includes a wireless transmitter, a messaging controller and a transmission monitor. The transmission monitor receives all wireless messages transmitted by the transmitter and provides them to the messaging controller for comparison with message requests that were sent to the transmitter by the messaging controller. If a particular wireless message has not been received by the transmission monitor and fed back to the messaging controller within a predetermined amount of time, the messaging controller triggers at least one controlling action such as re-sending the message request to the transmitter, switching channels in the transmitter or notifying a system administrator.

29 Claims, 10 Drawing Sheets

WIRELESS MESSAGE SYSTEM WITH MONITOR FEEDBACK AND AUTOMATIC BACKUP CONTROL

FIELD OF THE INVENTION

The present invention is directed in general to wireless messaging systems, and more specifically to a wireless messaging system having transmission feedback for verifying the transmittal of wireless messages.

BACKGROUND OF THE INVENTION

Commercial paging has been in use for many years to deliver short text or numerical messages to people who do not need to provide an immediate response. Repair crews, security guards, nurses and medical staff are typical users of wireless paging. Hospitals extensively use wireless paging to deliver emergency and mission critical messages to medical staff that simply require a message instruction to act immediately. In order to shorten the delivery time of critical messages, hospitals normally install on-site messaging systems that are especially made to deliver messages in a few seconds rather than minutes as is typical when using a commercial paging or other messaging service.

Conventions used by operators of two-way portable radios or on-site wireless telephones are meant to ensure that the receiver of a message provides feedback to the sender in the form of a spoken statement. These communications devices are typically larger and more expensive than pagers because they require hardware such as a microphone and a transmitter for effecting the two-way conversations. Furthermore, in environments such as hospitals, where messages need to be transmitted for the purposes of alerting the staff to emergencies and the like, two-way radios and on-site wireless telephones are of limited use because they do not have the facility to store a message for the receiver in case the receiver is too busy to vocally respond. In addition, FCC (Federal Communications Commission) and government communications agencies around the world do not typically approve of the use of commercial wireless telephones in hospitals due to possible interference with medical equipment.

The type of messages that are typically received by a pager or similar portable device are short text messages. These messages are often telephone numbers where the caller can be reached, or short text instructions. One of the assets of the pager lies in its ability to receive instruction messages of the type that do not require responses. Hospitals make use of on-site paging systems to immediately alert staff of emergency events such as a patient pressing a button in their room, a heart attack situation, urgent aid required, scheduled medicine administration, and all sorts of emergency and staff-to-staff communication needs. The benefit of an onsite messaging system capable of delivering immediate messages from telephones, network computers or stand-alone entry devices without having confirmation that the message was actually received can be greatly affected when the system itself can not confirm that the message was transmitted over the air and that the destination device received the message. For instance, hospital on-site paging systems are open-looped, but can have, by nature of typical hardware, many potential points of failure. Transmitters, for example, which are often situated on the roof of a building, are subject to weather hazards, and computers running such a system can crash as a result of various factors.

One of the key problems that results from using open-loop on-site paging and other messaging systems in general, is that no corrective action or administrator notification is effected at the time when a system failure occurs. Steps are taken only after someone complains that a message was not responded to, at which point several important messages could have been lost. This situation is unacceptable when messages are sent in connection with hospital emergencies and other critical instances in which speed of response is vital to the situation.

SUMMARY OF THE INVENTION

According to the present invention, a messaging system includes a transmission monitor for receiving all messages transmitted by a wireless transmitter and providing the messages to a messaging controller for comparison with message requests that have been sent to the transmitter by the messaging controller. If the messaging controller does not receive a particular message from the transmission monitor, the messaging controller triggers a controlling action.

According to one aspect of the present invention, a wireless messaging system comprises a transmitter for receiving message requests and in response transmitting corresponding wireless messages; a transmission monitor for receiving wireless messages transmitted by the transmitter; a messaging controller connected to the transmission monitor for receiving and storing message requests and automatically forwarding received message requests to the transmitter. The messaging controller comprises a controller timer for tracking time lapsed between forwarding by the messaging controller of each message request and receipt by the transmission monitor of each corresponding wireless message; and a first action trigger for triggering at least one controlling action when time tracked by the controller timer exceeds a first predetermined period.

In accordance with another aspect of the present invention, a method of controlling a wireless messaging system comprises the steps of receiving a message transmission request; storing the message transmission request; forwarding the message transmission request to a transmitter for wireless transmission; waiting for receipt of a wireless message corresponding to the stored transmission request; and if time elapsed before receiving the wireless message exceeds a first predetermined period, triggering at least one controlling action.

These together with other aspects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A detailed description of the preferred embodiments is set forth below, with reference to the following drawings, in which:

FIG. 7 is a flow diagram of an exemplary process effected by the paging system of FIG. 4a.

DETAILED DESCRIPTION OF THE PREFERRED EMBODIMENTS

According to the present invention in its most general aspect, a messaging system includes a transmission monitor for receiving all messages transmitted by the transmitter, and for providing the messages to a messaging controller for comparison with message requests that have been sent to the transmitter by the messaging controller. If the messaging controller does not receive a particular message from the transmission monitor, the controller triggers some controlling action, such as resending the message request to the transmitter or alerting a system administrator.

The following description of the preferred embodiment pertains in particular to onsite paging systems. However, it will be understood by one of ordinary skill in the art that the principles described herein are applicable to other wireless messaging systems that do not inherently require destination entities to confirm to the sender that a message has been received.

Figure 1:
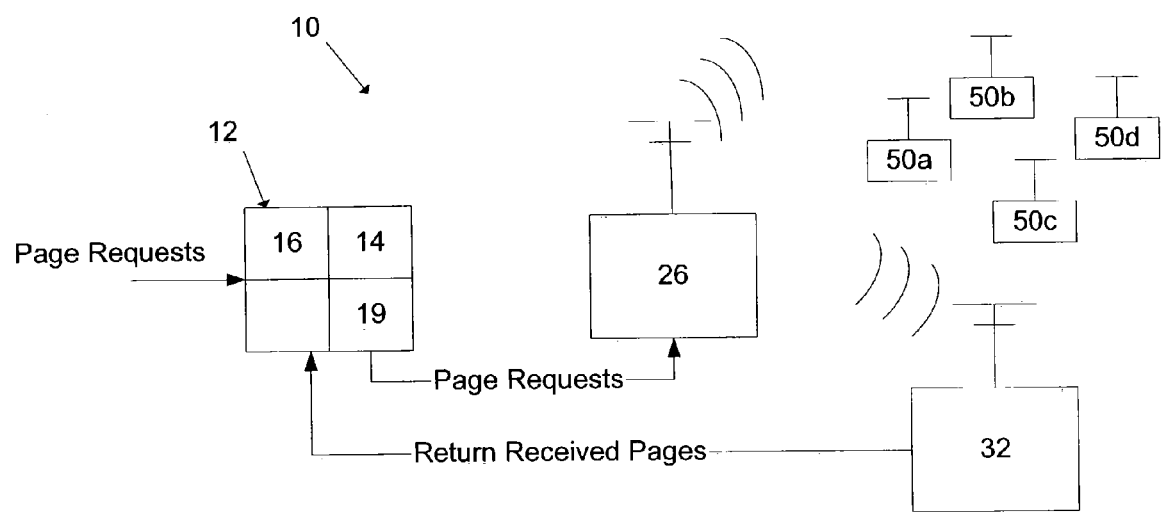
FIG. 1 is a block diagram of a paging system having a controller, transmitter and a transmission monitor according to one embodiment of the present invention.

With reference to FIG. 1, a paging system 10 comprises a paging controller 12, a wireless transmitter 26 and a transmission monitor 32. Paging controller 12 receives page requests, stores the page requests in a wait table in its memory 14 and forwards them to transmitter 26 for wireless transmission to one of pagers 50a, 50b, 50c or 50d. Transmission monitor 32 monitors transmissions to receive pages transmitted by transmitter 26 and feed them back to paging controller 12. When a page request has been forwarded by paging controller 12, a controller timer 16 begins counting. If the time lapsed since forwarding of a particular page request exceeds a programmable amount (i.e. 30 seconds) before it is determined that transmission monitor 32 received a corresponding page, a controller action trigger 19 triggers re-forwarding of the page request by paging controller 12 to transmitter 26 for wireless re-transmission. If necessary, the wait and re-forwarding procedure may be repeated up to 3 times (or as many as programmed), after which paging controller 12 triggers an alternative system integrity action such as logging the unreceived message and the time(s) it was forwarded. The alternative action might further include causing an alert generator (not shown) to notify the system administrator by alert (commercial page, email, text message or the like) that the page was not transmitted at all and some alternative action must be taken. The alert includes information useful to the administrator such as name, pagerID and the text of the message.

Paging controller 12 may be implemented in software running on a standard Windows 2000 server or any appropriate device that supports receipt, storage and forwarding of inbound messages and the specification of timing amounts and trigger actions. Page requests from multiple sources are fed into a message hub such as QUIKSERVER available from Canamex Communications Corporation of Markham, Ontario, Canada and subsequently provided via the server USB or RS-232 port to the paging controller 12. Messages from such sources are formatted according to the TAP (Telelocator Alphanumeric Protocol) protocol. The TAP protocol is used in the paging industry for sending messages from point to point via RS-232 or modem connection. It will be understood that paging controller 12 may be configured to receive messages sent by any other publicly available or proprietary protocol usable for sending messages to compatible destination pagers. Alternatively, page requests may be received by system 10 in another format (such as an SMTP email or TCP/IP request) and converted by system 10 into a format suitable for transmission to their respective destinations.

Paging controller 12 stores page requests in the wait table of memory 14, forwards them to transmitter 26, and controller timer 16 begins counting in respect of each page request. Prior to transmission, transmitter 26 encodes the received page requests according to the POCSAG (Post Office Code Standard Advisory Group) format using an encoder such as Canamex's DIGIPAGER EXPRESS. POCSAG, a standard protocol used in the paging industry, is a synchronous paging format that allows pages to be transmitted in a single batch. Alternatively, page requests are formatted according to any proprietary or standard protocol that permits wireless transmission of pages to compatible devices. The encoded page requests are amplified through a driver, converted into electromagnetic signals and transmitted via an antenna. In FIG. 1, page requests are forwarded directly to transmitter 26 by paging controller 12. However, though it is not shown in the diagrams, it may be that in order to reduce the amount of supporting hardware used in system 10, page requests are forwarded to transmitter 26 via transmission monitor 32.

It can be seen that if, for instance, a page is garbled during its first transmission due to interference, paging controller 12 is made aware of this fact because it is waiting for verification from transmission monitor 32 that an accurate page was indeed receivable by one of the destination pagers 50a–d. In this way, transmission monitor 32 closes the transmission loop so that paging system 10 triggers actions based on its own performance. If a page corresponding to a page request stored in the wait table of memory 14 is received by transmission monitor 32 within the programmed amount of time, the page is deemed correctly transmitted and the page request is removed from the wait table. At this point, a log is created that includes the date and time stamps for when the page request was forwarded to transmitter 26, and when the corresponding page was received by transmission monitor 32. The log itself provides verification that system 10 transmitted an accurate and receivable page. Furthermore, by including data in the log for determining lapse time for transmission of the page, the log will assist the system administrator in diagnosing the cause and start time of a subsequent problem, should it occur.

Figure 2:
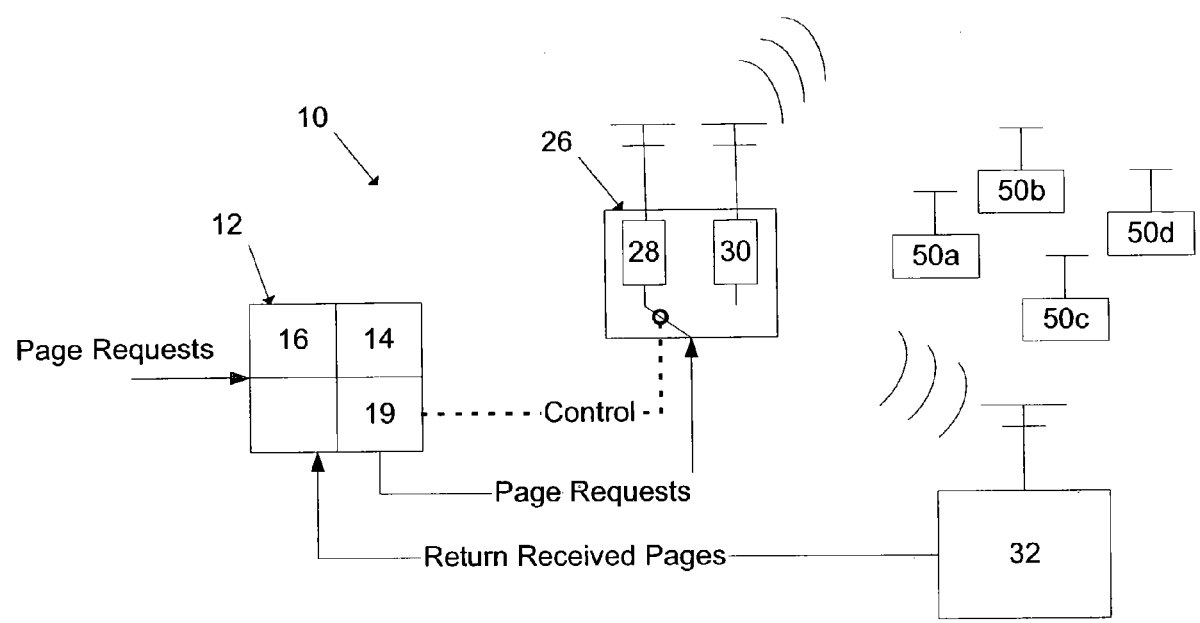
FIG. 2 is a block diagram of the paging system of FIG. 1 wherein, according to another embodiment of the present invention, the transmitter has a backup transmission channel.

FIG. 2 shows the paging system 10 of FIG. 1 wherein transmitter 26 includes a primary transmission channel 28 and a backup transmission channel 30. Paging controller 12 controls switching of the transmission channels. The use of backup transmission channel 30 vastly improves reliability of message transmission because, in the event that primary transmission channel 28 is malfunctioning due to a broken antenna or failed hardware, paging controller 12, upon non-receipt of a wireless page from transmission monitor 32, triggers switching to backup transmission channel 30. Backup transmission channel 30 has its own encoder, driver and antenna, independent of primary channel 28. With this configuration, it is clear that controller action trigger 19 will trigger re-forwarding of a stored page request if necessary. Alternately, controller action trigger 19 will activate backup transmission channel 30, or activate backup transmission channel 30 and trigger re-forwarding.

Figure 3A:
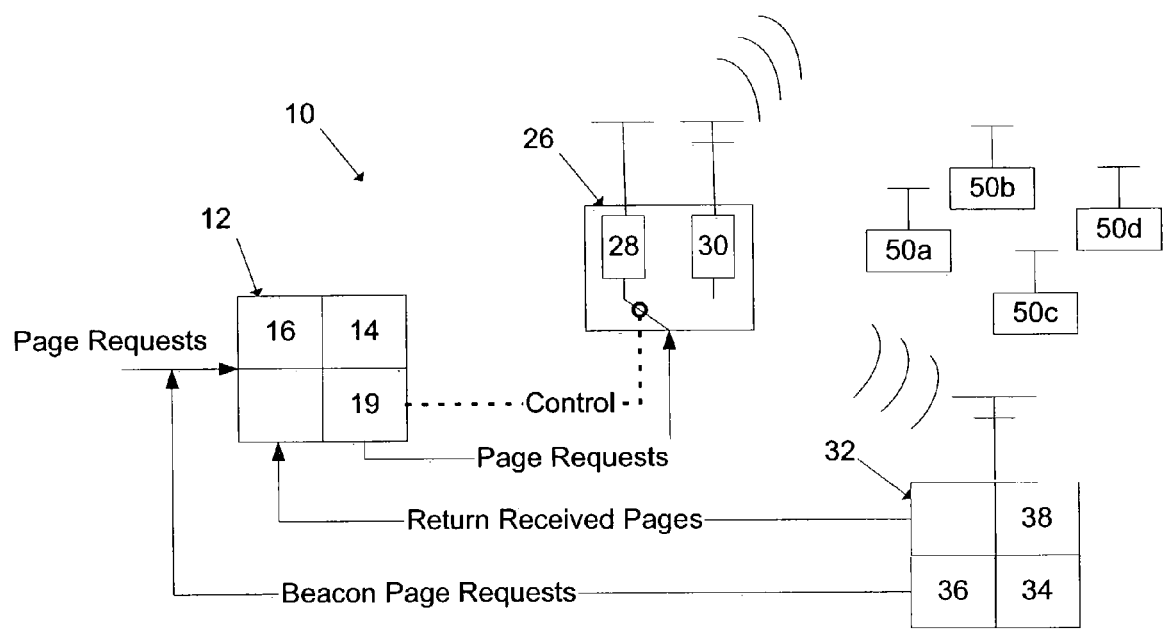
FIG. 3a is a block diagram of the paging system of FIG. 2 wherein, according to another embodiment of the present invention, the transmission monitor has a beacon page request generator.
Figure 3B:
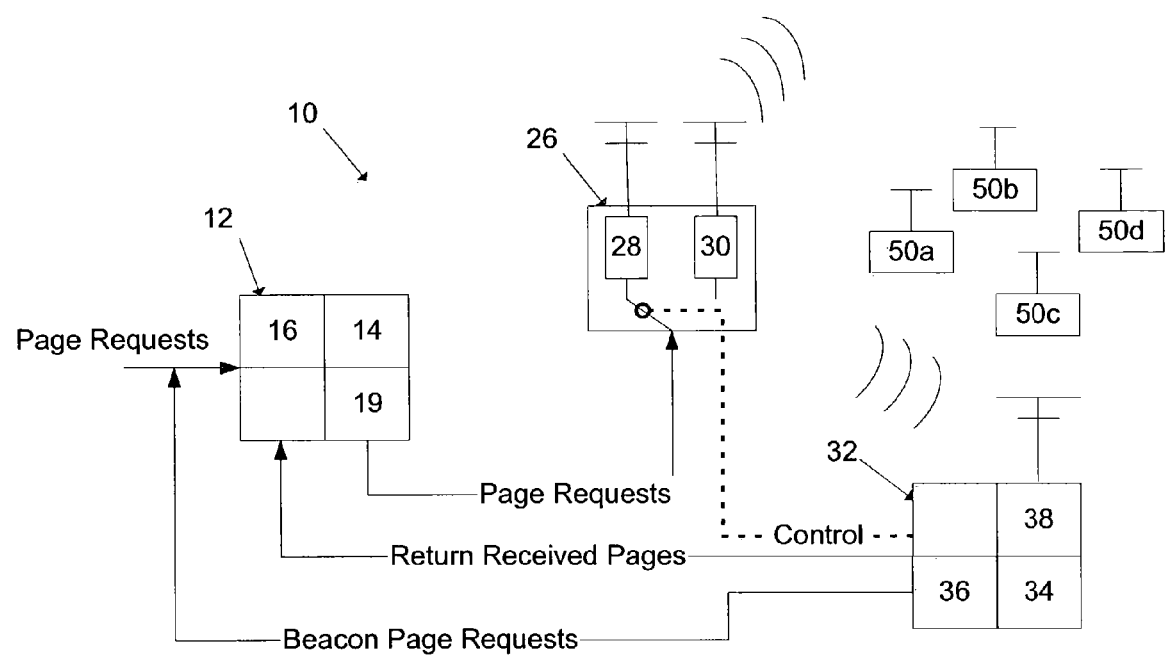
FIG. 3b is a block diagram of the paging system of FIG. 3a wherein, according to another embodiment of the present invention, the transmission monitor controls switching of the transmitter channels.

With reference to FIG. 3a, transmission monitor 32 further includes a monitor timer 34, a monitor action trigger 36 and a beacon page request generator 38. Because transmission monitor 32 is an entity separate from paging controller 12, it acts somewhat independently for performing system integrity actions. Monitor timer 34 in transmission monitor 32 resets each time a wireless page is received by transmission monitor 32, and monitor action trigger 36 triggers a system integrity action when monitor timer 34 exceeds a programmable period (i.e. 10 seconds). Preferably, the system integrity action includes causing beacon page request generator 38 on transmission monitor 32 to generate a beacon page request and feed it into paging controller 12 to be stored in the wait table of memory 14 and forwarded to transmitter 26. If transmission monitor 32 has not received a page in a little while, it attempts to generate its own beacon page to see if the rest of system 10 is working. If transmission monitor 32 receives its own beacon page, it resets monitor timer 34. If it does not, monitor action trigger 36 triggers another system integrity action such as cause an alert generator (not shown) to send the system administrator an alert in the form of an email, commercial page, text message or the like. In FIG. 3b, monitor action trigger 36 switches from primary transmission channel 28 to backup transmission channel 30 and triggers alerting of the system administrator of the change when monitor timer 34 exceeds the programmable period. In addition to the switch, trigger 36 causes the generation of another beacon page request to see if the channel change fixed the problem, and alerts the system administrator if it has.

Figure 4A:
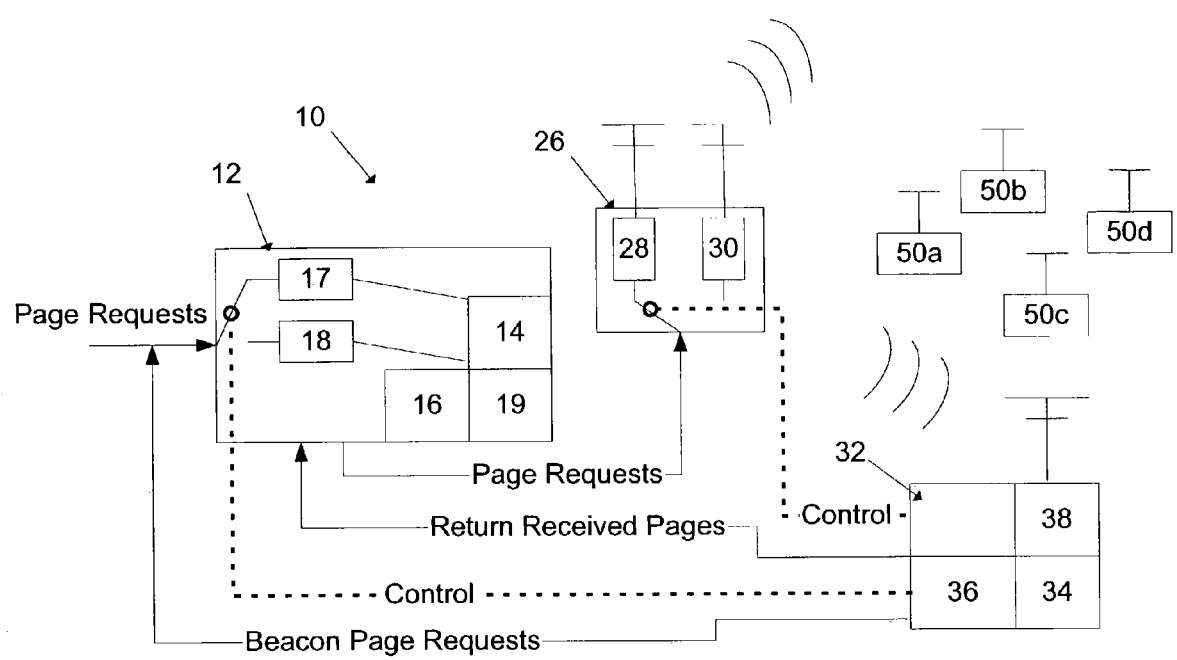
FIG. 4a is a block diagram of the paging system of FIG. 3b wherein, according to another embodiment of the present invention, the controller has two drives switchable by the transmission monitor.

With reference to FIG. 4a, paging controller 12, in addition to having a primary drive 17, has a backup drive 18 that keeps a mirror copy of the software and settings for performing controlling functions. Both drives 17 and 18 are connected to memory 14 which stores copies of all page requests in the wait table when they are received by paging controller 12. In this scenario, transmission monitor 32 is configured to have monitor action trigger 36 cause a reset of paging controller 12 to use backup drive 18. With the further system integrity action option, a number of alternate corrective scenarios are configurable in the event that transmissions are not being received by transmission monitor 32 by using a combination of beacon page requests, a switching of drives and a switching of the transmission channels.

Figure 4B:
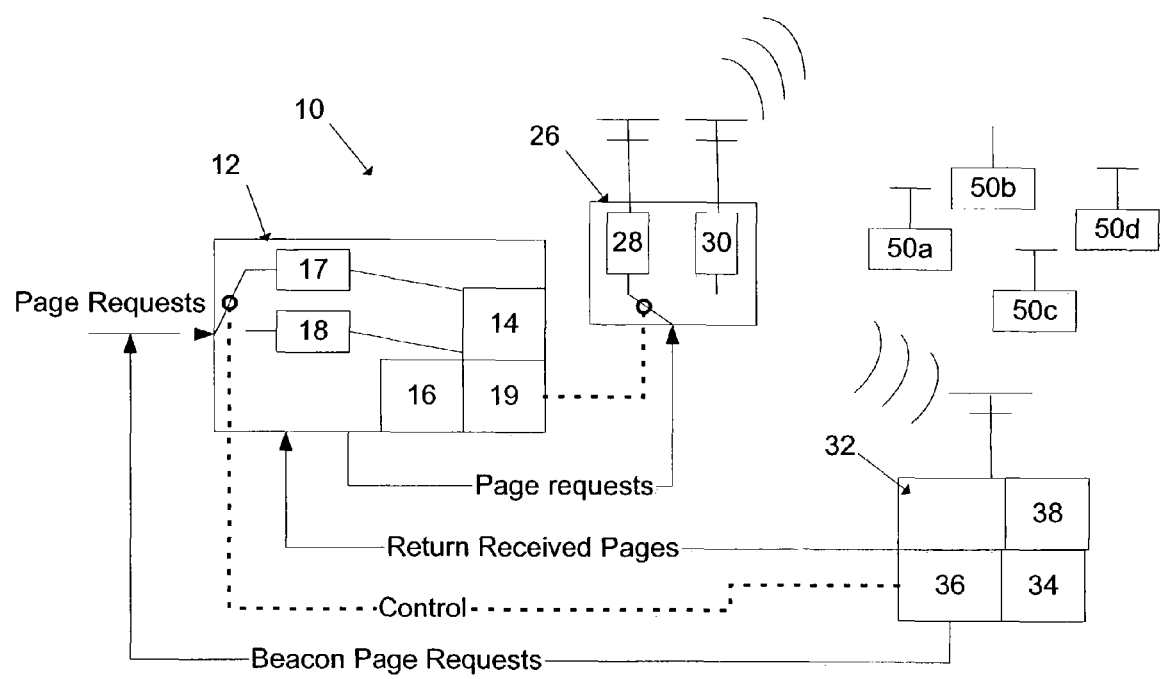
FIG. 4b is a block diagram of the paging system of FIG. 4a wherein, according to another embodiment of the present invention, the paging controller controls switching of the transmitter channels.

FIG. 4b shows another embodiment wherein the switching of the transmission channel of transmitter 26 is controlled by controller action trigger 19 of paging controller 12, rather than by monitor action trigger 36 of transmission monitor 32.

Figure 5:
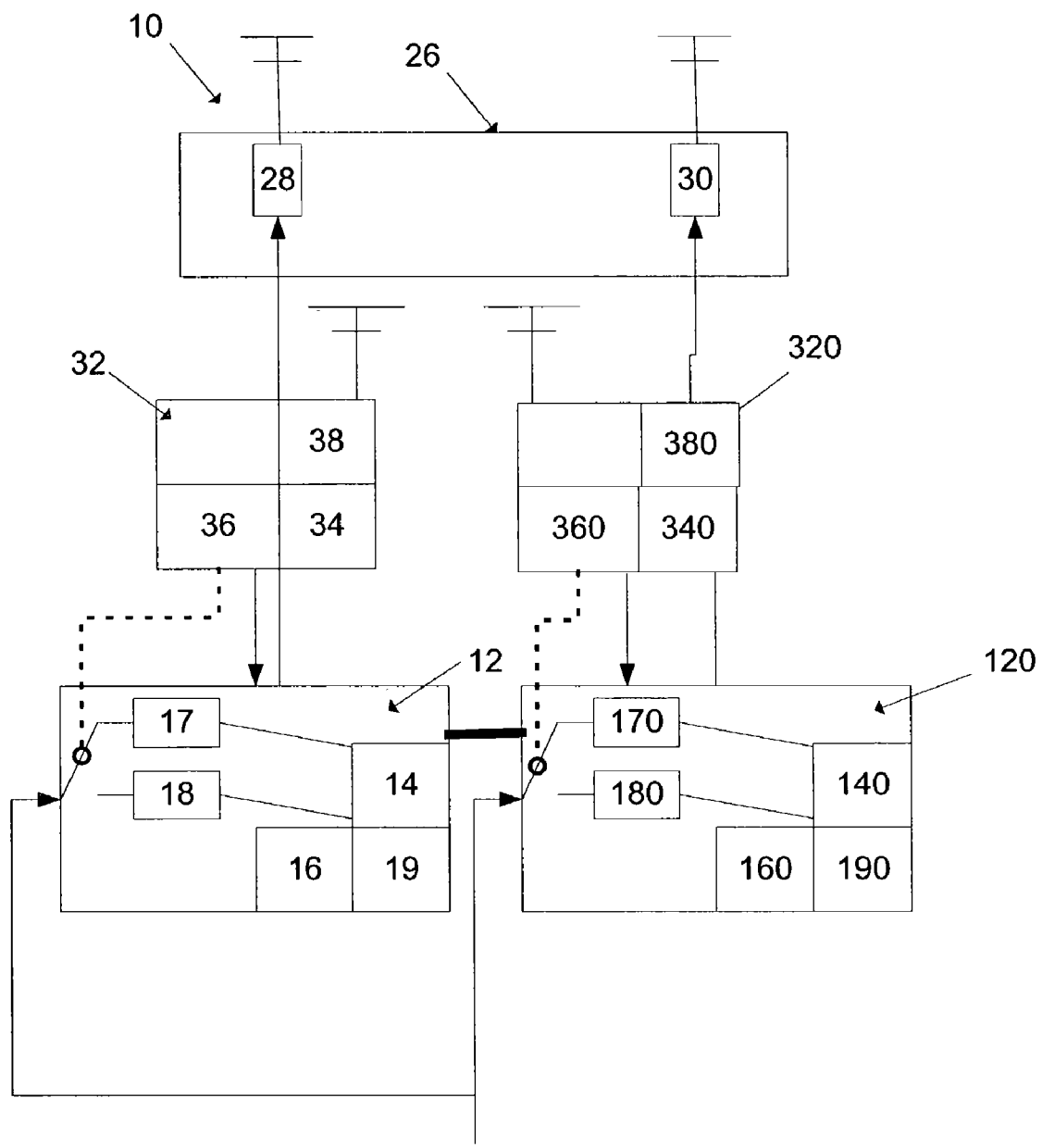
FIG. 5 is a block diagram of a paging system having a redundant subsystem with redundant controller and redundant monitor, according to another embodiment of the present invention.

FIG. 5 shows another embodiment of the present invention wherein paging system 10 includes a redundant subsystem having a backup paging controller 120 and a backup transmission monitor 320. Backup paging controller 120 has its own primary and secondary drives 170 and 180, backup controller memory 140, backup controller timer 160 and action trigger 190. Backup transmission monitor 320 has its own backup monitor timer 340, backup monitor action trigger 360 and backup beacon page request generator 380. The backup paging controller 120 is connected via a network to paging controller 12 and page requests are received by both controllers 12 and 120. Backup paging controller 120 takes control when paging controller 12 signals it to do so after determining that paging controller 12 is not receiving messages fed-back via its transmission monitor 32.

One of ordinary skill in the art would understand that fully redundant paging system 10 shown in FIG. 5 permits a large number of configuration options in terms of the cascading order of controller and system integrity actions by the paging controllers 12 and 120 and the transmission monitors 32 and 320. The system 10 shown in FIG. 5 provides a large number of fallbacks in case of several cascading points of failure.

Figure 6:
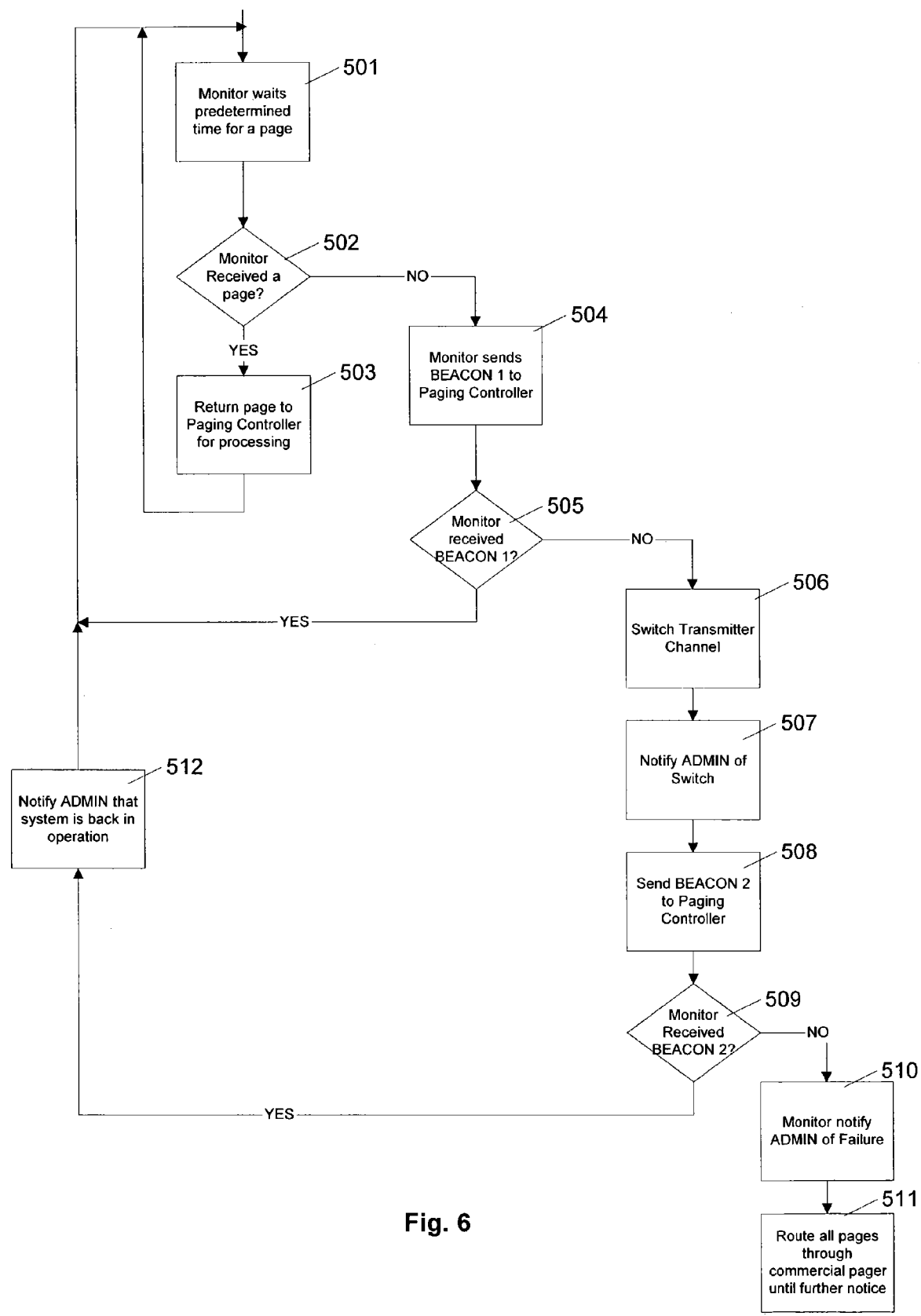
FIG. 6 is a flow diagram of an exemplary process effected by the paging system of FIG. 3b.

FIG. 6 shows the exemplary process effected by system 10 as shown in FIG. 3b, wherein transmission monitor 32 generates beacon requests to check system integrity. First, transmission monitor 32 waits a predetermined time, such as 15 seconds, for a page (step 501). It will be understood that the predetermined time may be programmed on transmission monitor 32 by a person configuring system 10 for the particular environment in which it is to be used. If, at step 502, a page is received, transmission monitor 32 returns the message to paging controller 12 for comparison with page requests stored in the wait table of memory 14 (step 503). If a page is not received within the predetermined time, transmission monitor 32 sends a first beacon page request to paging controller 12 for storing in wait table of memory 14 and forwarding to the transmitter 26 for transmission via primary channel 28 (step 504). If, at step 505, transmission monitor 32 does not receive its beacon, it sends a signal to paging controller 12 to switch to backup channel 30 (step 506). At this point, transmission monitor 32 notifies a system administrator via commercial page, email, text message or the like (step 507) and sends a second beacon page request to paging controller 12 to test if the channel switch successfully put system 10 back into operation (step 508). If, at step 509, the second beacon page request is not received by transmission monitor 32, the system administrator is notified of the failure (step 510), and subsequent page requests are routed through a commercial pager until further notice (step 511). If, at step 509, the second beacon page request is received, the system administrator is notified that the system is back in operation (step 512).

Figure 7:
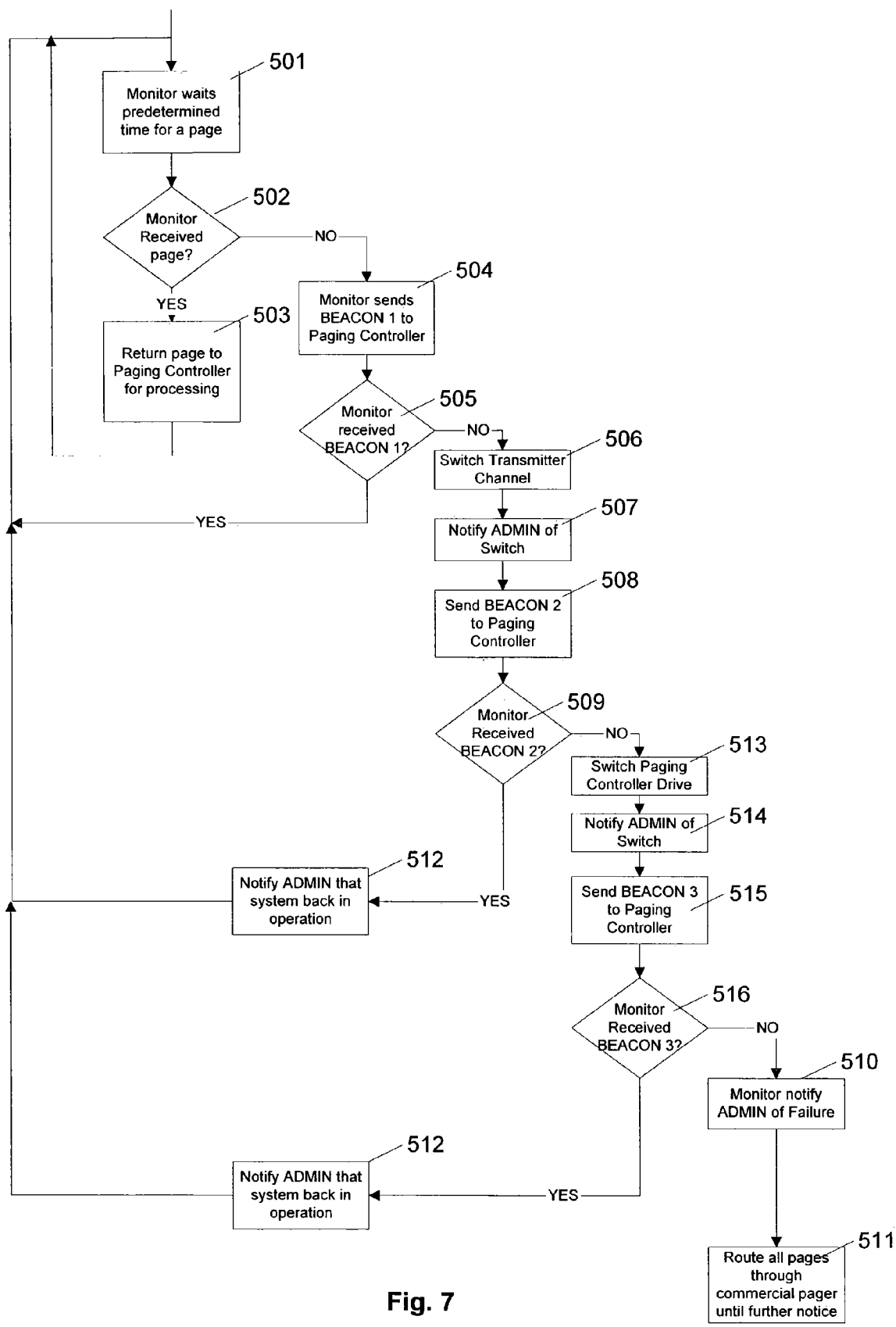

FIG. 7 shows an exemplary process effected by system 10 as shown in FIG. 4a, wherein transmission monitor 32 triggers transmitter 26 to switch channels and triggers paging controller 12 to switch drives. In the process of FIG. 7, the transmission monitor 32 first switches the transmitter channels and sends a second beacon page request if its first beacon request is not returned within a programmed amount of time (steps 501–508). If, at step 509, the second beacon page request is not returned, transmission monitor 32 switches paging controller 12 to backup drive 18 (step 513), notifies the system administrator of the switch (step 514) and sends a third beacon (step 515). If, at step 516, the third beacon is not returned, the system administrator is notified of the failure (step 510), and all subsequent pages are routed through a commercial pager system (step 511).

Figure 8:
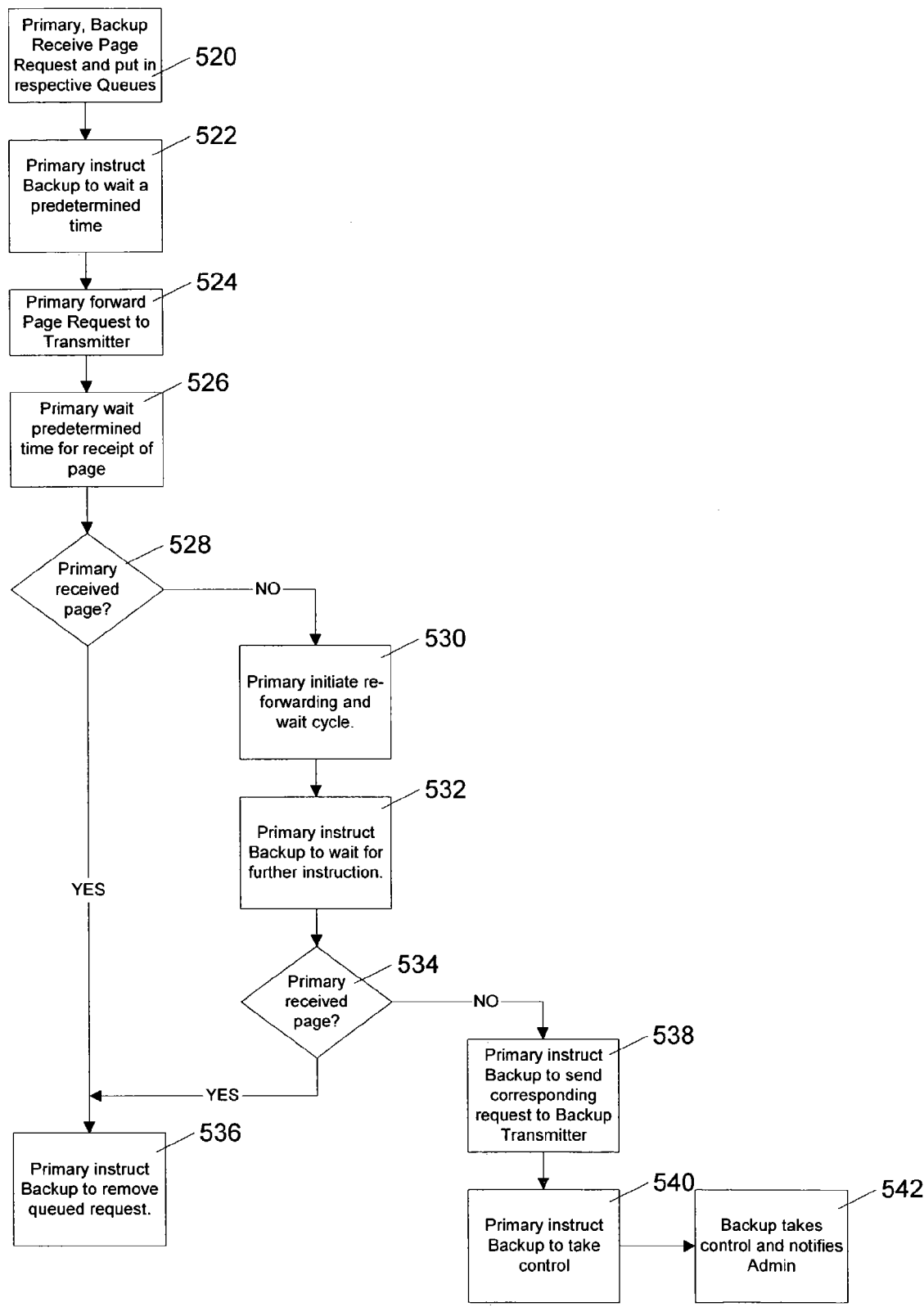
FIG. 8 is a flow diagram of an exemplary process effected by the paging system of FIG. 5.

FIG. 8 shows an exemplary process effected by the system 10 as shown in FIG. 5. Both primary and backup controllers 12 and 120 receive a page request and place it in their respective wait tables (step 520). Next, the primary controller 12 instructs backup controller 120 to wait for a predetermined time for instructions (step 522) and forwards the request to transmitter 26 for transmission from primary transmission channel 28 (step 524). If, after having waited a predetermined amount of time for the page to be returned to primary controller 12 via the transmission monitor 32 (step 526), primary controller 12 has not received a corresponding page (step 528), primary controller 12 initiates its re-forward and wait cycle (step 530) and instructs backup controller 120 to wait for further instruction (step 532). If, at step 534, primary controller 12 has not received the corresponding page via transmission monitor 32 after several re-forwards, it instructs backup controller 120 to forward the stored page request in backup controller's wait table to transmitter 26 for transmission via backup transmission channel 30 (step 538), and instructs backup controller 120 to take further control (step 540). Backup controller 120 takes control and alerts the administrator of the change (step 542). If, at step 534, primary controller 12 has received the corresponding page via transmission monitor 32, primary controller 12 instructs backup controller 120 to remove the request from its wait table (step 536).

In applications where transmission of pages is critical, such as hospitals, it is advantageous to cause alerts to be sent to system administrators whenever system 10 encounters a problem or makes a change to correct the problem. By ensuring that the system administrator is alerted whenever system 10 changes itself, the administrator is given the option to make plans to visit the site to repair or replace components, or to configure system 10 to use external commercial paging systems until it is repaired. For these situations, system 10 is programmed both at paging controller 12 and transmission monitor 32 to also trigger alert generators to generate appropriate alerts when trigger 19 or trigger 36 triggers a controlling or system integrity action.

Although the preferred embodiment has been described as applicable to onsite paging systems, one of ordinary skill in the art would understand that the principles described herein are applicable to various wireless communications networks and devices such as portable telephones and Personal Digital Assistants (PDAs) with wireless cards. Furthermore, a commercial pager network provider could implement the feedback system of the present invention for increasing reliability and thus provide more attractive service to customers. It is even conceivable that public and private radio stations could implement the feedback monitoring system of the present invention to ensure that broadcasts in geographically remote areas are receivable by those for whom they are intended.

One of ordinary skill in the art could apply the principles of the present invention to non-wireless or hybrid networks that disseminate messages by broadcast or that do not inherently require destination entities to confirm to the sender that a message has been received. A monitor integrated into such a network would feed each broadcasted message that it received back to the controller so that the controller would know which message was receivable by its destination. The controller would then have received enough information to take some action such confirming the message was receivable, re-sending the message, switching to an alternative network card, rebooting itself or activating a backup.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the purpose and scope of the invention.

What is claimed is:

1. A wireless messaging system, comprising:
   a transmitter for receiving message requests and in response transmitting corresponding wireless messages;
   an independent transmission monitor for receiving wireless messages transmitted by the transmitter;
   a messaging controller in communication with the independent transmission monitor, said messaging controller for receiving and storing message requests and automatically forwarding received message requests to the transmitter, the messaging controller comprising:
   a controller timer for tracking time lapsed between forwarding by the messaging controller of each message request and receipt by the independent transmission monitor of each corresponding wireless message; and
   a first action trigger for triggering at least one controlling action when time tracked by the controller timer exceeds a first predetermined period;
   said independent transmission monitor further comprising a monitor timer for tracking time lapsed since receipt by the independent transmission monitor of a wireless message and a second action trigger for triggering at least one system integrity action and resetting the monitor timer when the time tracked by the monitor timer exceeds a second predetermined period.

2. The wireless messaging system of claim 1, wherein the messaging controller comprises a primary drive and a backup drive and the at least one system integrity action comprises the independent transmission monitor sending a control message to the messaging controller to switch to the backup drive.

3. The wireless messaging system of claim 1, wherein the transmitter comprises at least one backup transmission channel and the at least one system integrity action comprises the independent transmission monitor sending a control signal to the transmitter to switch to the at least one backup transmission channel.

4. The wireless messaging system of claim 1, wherein the transmitter comprises at least one backup transmission channel and the at least one controlling action comprises the messaging controller sending a control signal to the transmitter to switch to the at least one backup transmission channel.

5. The wireless messaging system of claim 1, wherein the at least one controlling action comprises the messaging controlling forwarding all message requests to an external messaging system.

6. The wireless messaging system of claim 1, wherein the messaging controller comprises interconnected master and a slave operating systems, the slave operating system initiating control when directed by the master operating system.

7. The wireless messaging system of claim 1, wherein the messages are pages.

8. The wireless messaging system of claim 1, wherein the at least one controlling action comprises the messaging controller re-forwarding a stored message request.

9. The wireless messaging system of claim 8, further comprising:
- a backup independent transmission monitor for receiving wireless messages transmitted by the transmitter;
- a backup messaging controller for receiving and storing message requests, the backup messaging controller in communication with the backup independent transmission monitor and the messaging controller;
- a backup first action trigger connected to the backup messaging controller for triggering re-forwarding of a stored message request when time lapsed between forwarding of a message request and receipt of its corresponding wireless message by the independent transmission monitor exceeds a first predetermined period;
- wherein messages received by the backup messaging controller are automatically forwarded to the transmitter when the messaging controller is not forwarding messaging requests.

10. The wireless messaging system of claim 1, wherein the independent transmission monitor comprises a beacon message request generator and the at least one system integrity action comprises generating a beacon message request for receipt by the messaging controller.

11. The wireless messaging system of claim 10, wherein the messaging controller comprises a primary drive and a backup drive and the at least one system integrity action comprises the independent transmission monitor sending a control message to the messaging controller to switch to the backup drive.

12. The wireless messaging system of claim 10, wherein the transmitter comprises at least one backup transmission channel and the at least one system integrity action comprises the independent transmission monitor sending a control signal to the transmitter to switch to the at least one backup transmission channel.

13. The wireless messaging system of claim 1, wherein the independent transmission monitor further comprises an alert generator and the at least one system integrity action comprises the alert generator generating an alert for receipt by a system administrator.

14. The wireless messaging system of claim 13, wherein the alert generator is selected from the group consisting of an email generator, a text message generator, a telephone call generator and a commercial page request generator.

15. The wireless messaging system of claim 1, wherein the messaging controller further comprises an alert generator and the at least one controlling action comprises the alert generator generating an alert for receipt by a system administrator.

16. The wireless messaging system of claim 15, wherein the alert generator is selected from the group consisting of an email generator, a text message generator, a telephone call generator and a commercial page request generator.

17. A method of controlling a wireless messaging system, the method comprising:
- receiving a message transmission request;
- storing the message transmission request;
- forwarding the message transmission request to a transmitter for wireless transmission;
- waiting for an indication from an independent transmission monitor of receipt of a wireless message corresponding to the stored transmission request; and
- if time elapsed before said receipt exceeds a first predetermined period, triggering at least one controlling action;
- said independent transmission monitor tracking time lapsed since receipt by said independent transmission monitor of any wireless message; and
- if time lapsed before said independent transmission monitor receiving any wireless message exceeds a second predetermined period, said transmission monitor triggering at least one system integrity action.

18. The method of claim 17, wherein the at least one controlling action comprises re-forwarding the transmission request.

19. The method of claim 17, wherein the at least one system integrity action comprises generating a message transmission request for storing and forwarding to the transmitter.

20. The method of claim 17, wherein the at least one system integrity action comprises reconfiguring the wireless messaging system.

21. The method of claim 19, wherein the at least one system integrity action comprises reconfiguring the wireless messaging system.

22. The method of claim 17, wherein the at least one system integrity action comprises alerting a system administrator.

23. The method of claim 17, wherein the at least one controlling action comprises reconfiguring the wireless messaging system.

24. The method of claim 17, wherein the at least one controlling action comprises reconfiguring the wireless messaging system.

25. The method of claim 17, wherein the at least one controlling action comprises alerting a system administrator.

26. The method of claim 17, wherein the at least one controlling action comprises forwarding the message transmission request to an external messaging system.

27. The method of claim 17, wherein the message is a page.

28. A wireless messaging system, comprising:
- a transmitter for receiving message requests and in response transmitting corresponding wireless messages;
- a transmission monitor for receiving wireless messages transmitted by the transmitter;
- a messaging controller connected to the transmission monitor for receiving and storing message requests and automatically forwarding received message requests to the transmitter, the messaging controller comprising:
- a controller timer for tracking time lapsed between forwarding by the messaging controller of each message request and receipt by the transmission monitor of each corresponding wireless message; and
- a first action trigger for triggering at least one controlling action when time tracked by the controller timer exceeds a first predetermined period;
- wherein the transmission monitor further comprises a monitor timer for tracking time lapsed since receipt by the transmission monitor of a wireless message and a second action trigger for triggering at least one system integrity action and resetting the timer when the time tracked by the timer exceeds a second predetermined period;

wherein the messaging controller comprises a primary drive and a backup drive and the at least one system integrity action comprises the transmission monitor sending a control message to the messaging controller to switch to the backup drive.

29. A wireless messaging system, comprising:

a transmitter for receiving message requests and in response transmitting corresponding wireless messages;

a transmission monitor for receiving wireless messages transmitted by the transmitter;

a messaging controller connected to the transmission monitor for receiving and storing message requests and automatically forwarding received message requests to the transmitter, the messaging controller comprising:

a controller timer for tracking time lapsed between forwarding by the messaging controller of each message request and receipt by the transmission monitor of each corresponding wireless message; and a first action trigger for triggering at least one controlling action when time tracked by the controller timer exceeds a first predetermined period;

wherein the transmission monitor further comprises a monitor timer for tracking time lapsed since receipt by the transmission monitor of a wireless message and a second action trigger for triggering at least one system integrity action and resetting the timer when the time tracked by the timer exceeds a second predetermined period;

wherein the transmission monitor comprises a beacon message request generator and the at least one system integrity action comprises generating a beacon message request for receipt by the messaging controller; and wherein the messaging controller comprises a primary drive and a backup drive and the at least one system integrity action comprises the transmission monitor sending a control message to the messaging controller to switch to the backup drive.

* * * * *